(12) United States Patent
Zhang

(10) Patent No.: US 8,599,584 B2
(45) Date of Patent: Dec. 3, 2013

(54) DEVICE FOR FEEDING BACK POWER

(75) Inventor: Dongsheng Zhang, Beijing (CN)

(73) Assignee: New Energy Power Company, Beijing (CN)

( * ) Notice: Subject to any disclaimer, the term of this patent is extended or adjusted under 35 U.S.C. 154(b) by 1008 days.

(21) Appl. No.: 12/596,874

(22) PCT Filed: Mar. 12, 2009

(86) PCT No.: PCT/CN2009/070758
§ 371 (c)(1),
(2), (4) Date: Oct. 21, 2009

(87) PCT Pub. No.: WO2009/115018
PCT Pub. Date: Sep. 24, 2009

(65) Prior Publication Data
US 2010/0149841 A1    Jun. 17, 2010

(30) Foreign Application Priority Data

Mar. 18, 2008 (CN) .......................... 2008 1 0084692

(51) Int. Cl.
*H02M 5/458* (2006.01)
(52) U.S. Cl.
USPC .......................................................... 363/37
(58) Field of Classification Search
USPC ............... 363/34, 37, 65, 67, 69–71, 87, 129, 363/135, 137
See application file for complete search history.

(56) References Cited

U.S. PATENT DOCUMENTS 5,177,460 A    1/1993  Dhyanchand et al.
6,154,378 A *  11/2000 Peterson et al. ................ 363/37

(Continued)

FOREIGN PATENT DOCUMENTS

CN    1259767 C    6/2006
CN    1992496 A    7/2007

(Continued)

OTHER PUBLICATIONS

International Search Report dated Jun. 25, 2009 (4 pages).

(Continued)

*Primary Examiner* — Adolf Berhane
*Assistant Examiner* — Yemane Mehari
(74) *Attorney, Agent, or Firm* — Harrity & Harrity, LLP

(57) ABSTRACT

The present invention relates to a power feedback device, including: an AC input power source, which is three-phase or multi-phase AC, or three-phase or multi-phase AC in which the output terminal is connected in series with an inductor, for generating power; a plurality of power converting units, the input terminals of which are respectively connected with two phases of the AC input power source, for power converting the two phases of AC generated by the AC input power source respectively; an isolating transformer, the primary side of which is a three-phase winding and connected with a power network, the secondary side of which is multi-path of three-phase windings and connected with the output terminals of the plurality of power converting units, for feeding the AC converted by the plurality of power converting units back to the power network. The power feedback device according to the present invention can improve the waveform coefficients of the current of the power generation device, and increase the power factors and the utilization rate of the device, and also, the device matches power networks of different voltage levels, thereby improving the waveform coefficients of the current fed back to the power networks and lowering harmonic component.

18 Claims, 7 Drawing Sheets

(56) References Cited

U.S. PATENT DOCUMENTS

| | | | |
|---|---|---|---|
| 6,690,588 B2 * | 2/2004 | York | 363/65 |
| 6,731,524 B2 * | 5/2004 | Elek et al. | 363/70 |
| 7,006,366 B2 * | 2/2006 | Panda et al. | 363/70 |
| 2004/0100102 A1 | 5/2004 | Wobben | |

FOREIGN PATENT DOCUMENTS

| | | |
|---|---|---|
| DE | 3934836 A1 | 4/1991 |
| DE | 4232356 A1 | 3/1994 |
| DE | 19845903 A1 | 4/2000 |
| EP | 0149169 A2 | 7/1985 |
| EP | 0299275 A1 | 1/1989 |
| EP | 1244203 A2 | 9/2002 |
| EP | 1318589 A1 | 6/2003 |

OTHER PUBLICATIONS

He, Yikang, He, Mingming, et al., "Analysis on the Frequency Converter Served for the AC Excitation of Wind-power DFIG", Automation of Electric Power Systems, Feb. 25, 2006, Vo. 30, No. 4, pp. 105-112 (English Abstract).

European Search Report corresponding to EP 09 72 2444 mailed Jun. 27, 2012, 9 pages.

* cited by examiner

DEVICE FOR FEEDING BACK POWER

The present application claims the priority of the Chinese patent application No. 200810084692.7 filed with the Chinese Patent Office on Mar. 18, 2008 entitled "A Power Feedback Device", the entire contents of which are incorporated herein by reference.

FIELD OF THE INVENTION

The present invention relates to power electronic technologies, particularly to a power feedback device.

BACKGROUND OF THE INVENTION

People are paying more and more attention to the use of the power generation of renewable resources such as wind power generation, solar power generation, and tidal power generation. Common features of power generation systems of such new resources lie in dispersive power generation devices, small unit capacity, wide distribution area, and unstable output voltage and current. It has been currently an urgent problem to be solved in our country and worldwide on how to feed the power generated by the power generation devices of such renewable resources back to power networks efficiently, reliably at a low cost, so that the power generated by the power generation devices can be converted into the three-phase power for industrial and domestic use directly.

An AC excited wound rotor double-fed generator variable-speed constant-frequency wind power generation system is adopted in a power feedback device for wind power generation in the prior art, and a power converter at the rotor side is adopted in this system to adjust the AC excited current of the double-fed generator so that the stator winding of the generator generates power which is directly fed back to power networks. Due to the feature of double-fed generator systems, a power converter with low voltage and operating in four quadrants are generally desired, for example, an AC-DC-AC two-level converter that can operate in four quadrants. FIG. 1 illustrates the principle of an AC-DC-AC two-level frequency converter that can operate in four quadrants in the prior art. As shown in FIG. 1, the frequency converter according to this solution only processes slip power, and general rated power is one third of the capacity of the generator and also falls into a low voltage converter. Thus, the cost and volume of the converter is greatly decreased, while this solution has disadvantages that the volume and cost of the generator is increased as wound rotor is adopted in the generator and AC excitation are conducted via slip ring, and the generator has a high failure rate and maintenance fee due to the use of the slip ring.

A permanent magnetic generator variable-speed constant-frequency wind power generation system is adopted in another power feedback device for wind power generation in the prior art. In this solution, a fan impeller makes the permanent magnetic generator to rotate, and the power generated is changed into three-phase AC power matching the power networks after being variable-frequency modulated by the power converter and is then fed back to the power networks, realizing variable-speed constant-frequency power generation. FIG. 2 illustrates the principle of the variable-speed constant-frequency wind power generation system of a permanent magnetic generator in the prior art, and FIG. 3 illustrates the principle of another variable-speed constant-frequency wind power generation system of a permanent magnetic generator in the prior art. As shown in FIGS. 2 and 3, this solution solves the problem of reliability of the generator in the above solution, and the whole system runs at a lower failure rate, but the converter has a high cost and the converting device has a large volume as in this solution the converter power is the same with the generator power and many electrolytic capacitors need to be used. FIG. 4 illustrates the principle of a variable-speed constant-frequency wind power generation system in which a current type converter is adopted in the prior art. As shown in FIG. 4, a semi-controllable power semiconductor device thyristor is adopted in this system, although this solution has low cost, it has serious harmonic pollution at the network side, and the power factor is low, and harmonic treatment device need to be added additionally, which raises the overall cost.

SUMMARY OF THE INVENTION

The objective of the present invention is to provide a power feedback device so as to overcome the disadvantages in the prior art of serious harmonic pollution and low power factor, to improve the waveform coefficients of the current from power generation device, to increase the power factor and the utilization of the device, and to lower harmonic content, characterized by advantages of low cost, high reliability and high conversion efficiency.

The present invention provides a power feedback device, comprising:

an AC input power source, which is three-phase or multi-phase AC, or three-phase or multi-phase AC in which the output terminal is connected in series with an inductor, for generating power;

a plurality of power converting units, the input terminals of which are respectively connected with two phases of the AC input power source, for power converting the two-phases of AC generated by the AC input power source respectively;

an isolating transformer, the primary side of which is a three-phase winding and connected with a power network, the secondary side of which is a multi-paths three-phase windings and connected with the output terminals of a plurality of power converting units, for feeding the AC converted by the plurality of power converting units back to the power network.

Wherein, the power converting unit may include:
a rectifier circuit, for converting the single-phase AC of the AC input power source into DC;
a thyristor three-phase full-controlled bridge circuit or a thyristor three-phase full-controlled bridge circuit string series connected with a plurality of input terminals, the input terminal of the thyristor three-phase full-controlled bridge circuit or the thyristor three-phase full-controlled bridge circuit string series connected with a plurality of input terminals being connected with the output terminal of the rectifier circuit, for converting the DC output from the rectifier circuit into AC;

the power converting units may further include: an inductor, provided between the rectifier circuit and the thyristor three-phase full-controlled bridge circuit or the thyristor three-phase full-controlled bridge circuit string series connected with a plurality of input terminals, for filtering and current limiting the DC output from the rectifier circuit.

The rectifier circuit can be a diode rectifier bridge circuit or a thyristor rectifier bridge circuit.

Furthermore, the power feedback device may further include: at least one PWM three-phase inverter bridge circuit consisting of a filtering capacitor and a fully controlled power semiconductor device, the output terminal of the PWM three-phase inverter bridge circuit being connected in series with the inductor and then being connected with the three-phase winding of the secondary side of the isolating transformer, or being connected with the output terminals of the power converting units, or being connected with the output terminals of the power converting units via an isolating capacitor, or being connected with the three-phase winding of the secondary side of the isolating transformer via an isolating capacitor, for compensating the current power factor and harmonic at the primary side of the isolating transformer.

The fully controlled power semiconductor device may be other devices such as IGBT or IGCT.

The isolating transformer in the power feedback device may also be a split transformer in which the primary-side windings are a plurality of three-phase windings connected in parallel, or a phase shift transformer in which the secondary-side windings are in phase shift winding manner.

The power feedback device according to the present invention improves the waveform coefficients of the current of the power generation device and increases the power factors and the utilization rate of the device by respectively power converting any two phases among the three phases or multiple phases of AC generated by the power generation device. The multiple paths of windings at the secondary side of the isolating transformer match the device with power networks of different voltage levels, thereby improving the waveform coefficients of the current fed back to the power networks and lowering harmonic component, and the device has advantages of high conversion efficiency, reliable operation, long service life, easy for popularization and maintenance.

BRIEF DESCRIPTION OF THE ACCOMPANYING DRAWINGS

DETAILED DESCRIPTION OF THE INVENTION

The technical solution of the present invention will be further detailed hereinafter taken in conjunction with the drawings and the embodiments thereof.

Figure 1:
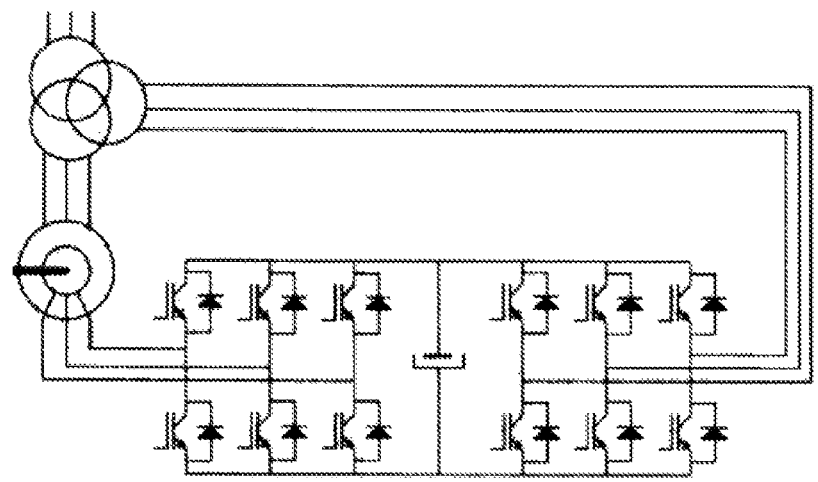
FIG. 1 illustrates the principle of an AC-DC-AC two-level converter that can operate in four quadrants in the prior art.
Figure 2:
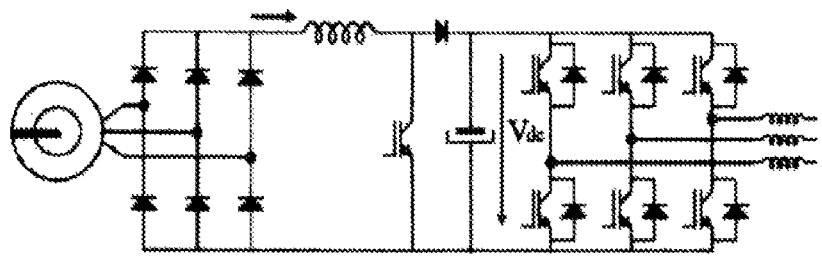
FIG. 2 illustrates the principle of the variable-speed constant-frequency wind power generation system of a permanent magnetic generator in the prior art.
Figure 3:
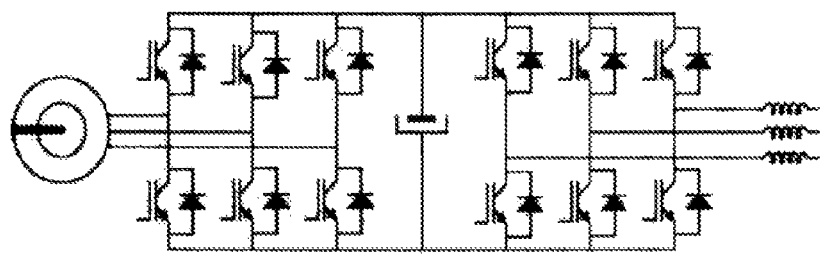
FIG. 3 illustrates the principle of another variable-speed constant-frequency wind power generation system of a permanent magnetic generator in the prior art.
Figure 4:
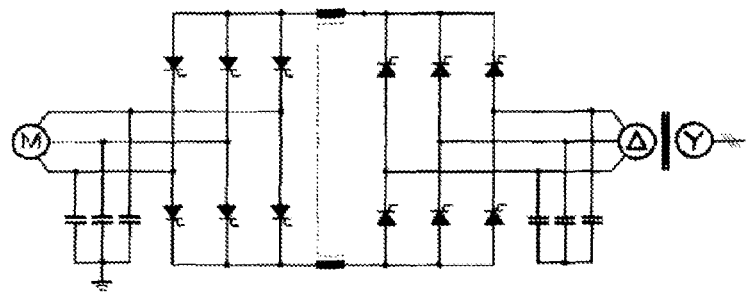
FIG. 4 illustrates the principle of a variable-speed constant-frequency wind power generation system in which a current type converter is adopted in the prior art.
Figure 5:
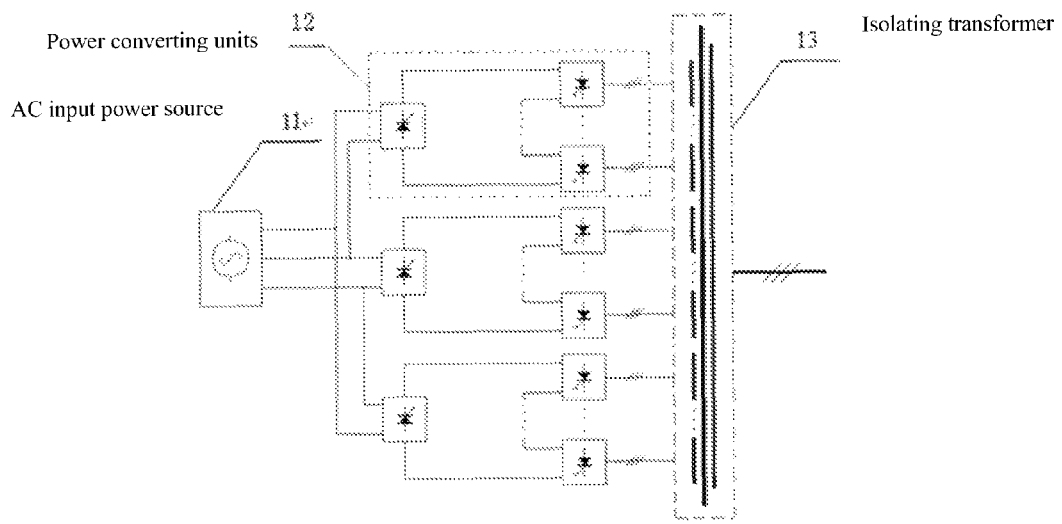
FIG. 5 illustrates the principle of embodiment 1 of the power feedback device according to the present invention.

FIG. 5 illustrates the principle of embodiment 1 of the power feedback device according to the present invention. As shown in FIG. 5, the power feedback device includes: an AC input power source 11, a plurality of power converting units 12 and an isolating transformer 13; wherein the AC input power source 11 is three-phase or multi-phase AC or three-phase or multi-phase AC in which the output terminal is connected in series with an inductor, for generating power; the input terminals of the a plurality of power converting units 12 are respectively connected with two terminals of the AC input power source 11, for power converting the two phases of AC generated by the AC input power source 11 respectively; the primary side of the isolating transformer 13 is a three-phase winding and connected with a power network, and the secondary side of the isolating transformer 13 is a multi-path three-phase winding and connected with the output terminals of the a plurality of power converting units 12, for feeding the AC converted by the a plurality of power converting units 12 back to the power network.

Figure 6:
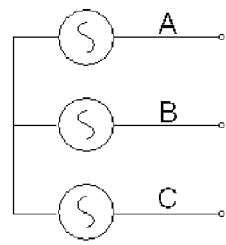
FIG. 6 is the first drawing illustrating the principle of the three-phase AC power source of the embodiment of the power feedback device according to the present invention.
Figure 7:
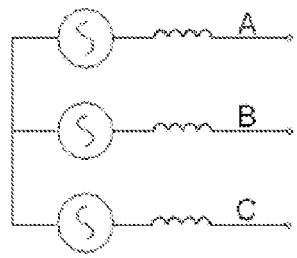
FIG. 7 is the second drawing illustrating the principle of the three-phase AC power source of the embodiment of the power feedback device according to the present invention.
Figure 8:
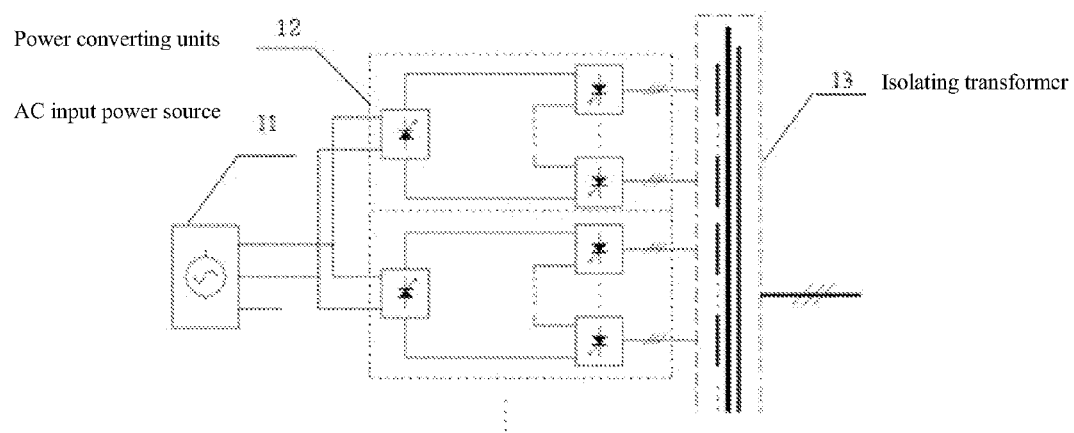
FIG. 8 illustrates the principle of the a plurality of power converting units connected in parallel coupling with two-phase AC of the embodiment of the power feedback device according to the present invention.

Wherein, the AC input power source 11 may be power generation device of renewable resources such as wind power generation device, solar power generation device, or tidal power generation device. As the device for generating the AC are different, that is, the AC input power source 11 may generate three-phase AC, six-phase AC, or other multi-phase AC, the number of the power converting units 12 varies with the number of the phases of the AC input power source 11 correspondingly. The three-phase AC will be taken as an example hereinafter for explanation. FIG. 6 is the first drawing illustrating the principle of the three-phase AC power source of the embodiment of the power feedback device according to the present invention, and in order to render the current output of the three-phase AC power source more stable, the output terminals of the three-phase AC power source can be respectively connected in series with an inductor, and as shown in FIG. 7, FIG. 7 is the second drawing illustrating the principle of the three-phase AC power source of the embodiment of the power feedback device according to the present invention. Three power converting units 12 are adopted to be respectively connected to any two phases of the three-phase AC input power source 11, and specifically, phase AB, phase BC and phase AC of the three-phase AC input power source 11 are respectively connected to the input terminal of one power converting unit 12, and the output terminals of the power converting units 12 are respectively connected with one path of the three-phase winding at the secondary side of the isolating transformer 13. Such power converting units 12 may realize the power conversion of any two phases of the AC of the AC input power source 11 in a manner of firstly rectifying and filtering any two phases of AC of the AC input power source 11, and then converting the rectified and filtered DC into AC, which, however, is not limited to the above, thereby converting the AC input power source 11 into large output power by a small capacity power converting units 12, then electrically coupling the three-phase or multi-phase AC converted by a plurality of power converting units 12 to the primary side by the multi-path three-phase winding of the secondary side of the isolating transformer 13, and finally feeding the three-phase or multi-phase AC back to the power network via the three-phase winding at the primary side and the power network. Wherein, any two phases of the AC input power source 11 may also be connected to two or more power converting units 12 connected in parallel, and the number of the power converting units 12 connected in parallel depends on the capacity of the AC input power source 11, and when the capacity is large, a plurality of power converting units 12 can be adopted, and this manner that any two phases of the AC input power source 11 are connected in parallel with a plurality of power converting units 12 is adaptive to the power generation device with large capacity, in which large output power can be obtained by small capacity power converting units 12. As shown in FIG. 8, FIG. 8 illustrates the principle of the a plurality of power converting units connected in parallel to the two-phase AC of the embodiment of the power feedback device according to the present invention.

The power feedback device according to the present invention improves the waveform coefficients of the current of the power generation device and increases the power factors and the utilization rate of the device by respectively power converting any two phases among the three phases or multiple phases of AC generated by the power generation device. The multiple paths of windings at the secondary side of the isolating transformer match the device with power networks of different voltage levels, thereby improving the waveform coefficients power factors of the current fed back to the power networks.

Figure 9:
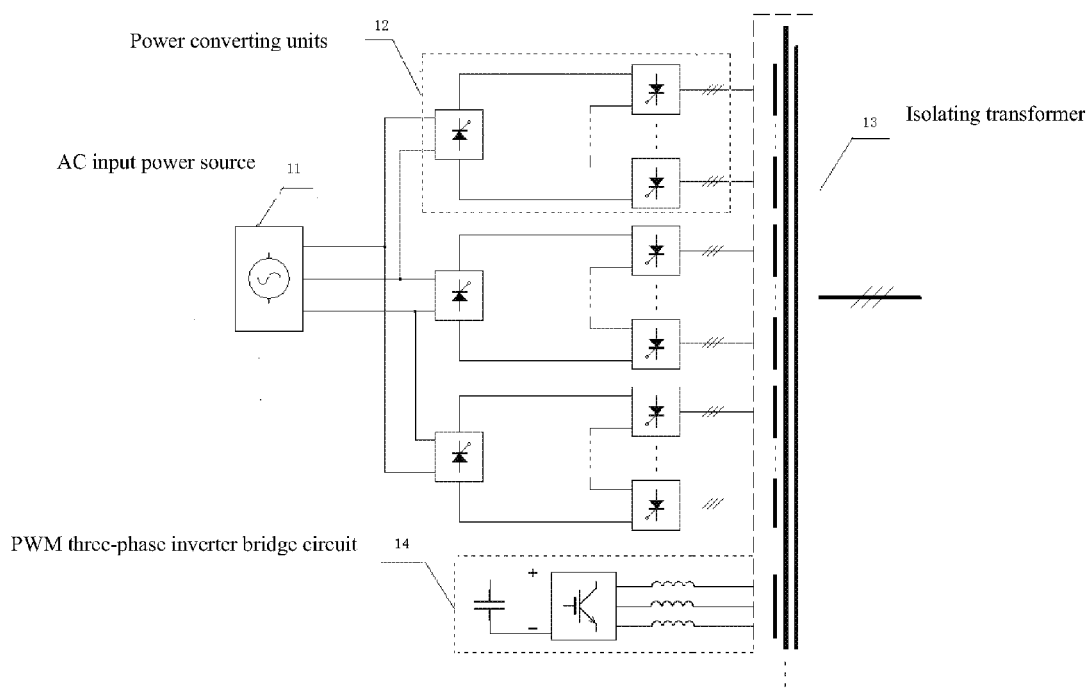
FIG. 9 illustrates the principle of embodiment 2 of the power feedback device according to the present invention.

FIG. 9 illustrates the principle of embodiment 2 of the power feedback device according to the present invention. As shown in FIG. 9, the power feedback device includes: an AC input power source 11, a plurality of power converting units 12, and an isolating transformer 13; and the device may further include: at least one Pulse Width Modulation (short for PWM hereinafter) three-phase inverter bridge circuit 14 consisting of a filtering capacitor and a fully controlled power semiconductor device, the output terminal of the PWM three-phase inverter bridge circuit being connected in series with the inductor and then being connected with the three-phase winding of the secondary side of the isolating transformer 13, or being connected with the output terminals of the power converting units 12, or being connected with the output terminals of the power converting units 12 via an isolating capacitor, or being connected with the three-phase winding of the secondary side of the isolating transformer 13 via an isolating capacitor, for compensating the current power factors and harmonic at the primary side of the isolating transformer 13. Furthermore, the power converting unit 12 can include: a rectifier circuit and a thyristor three-phase full-controlled bridge circuit or a thyristor three-phase full-controlled bridge circuit string series connected with a plurality of input terminals; the rectifier circuit is used for converting the single-phase AC of the AC input power source 11 into DC; the input terminal of the thyristor three-phase full-controlled bridge circuit or the thyristor three-phase full-controlled bridge circuit string series connected with a plurality of input terminals is connected with the output terminal of the rectifier circuit, for converting the DC output from the rectifier circuit into AC. The power converting unit 12 may further include: an inductor, provided between the rectifier circuit and the thyristor three-phase full-controlled bridge circuit or the thyristor three-phase full-controlled bridge circuit string series connected with a plurality of input terminals, for filtering and current limiting the DC output from the rectifier circuit.

Figure 10:
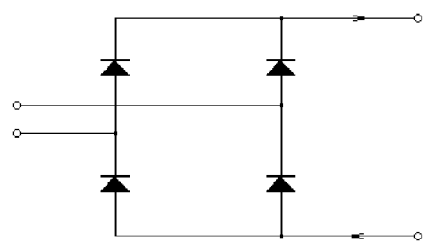
FIG. 10 illustrates the principle of the diode rectifier bridge of the embodiment of the power feedback device according to the present invention.
Figure 11:
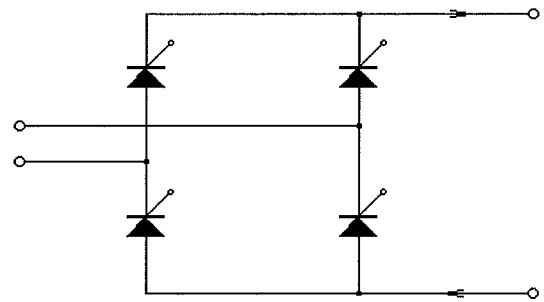
FIG. 11 illustrates the principle of the thyristor rectifier bridge of the embodiment of the power feedback device according to the present invention.
Figure 12:
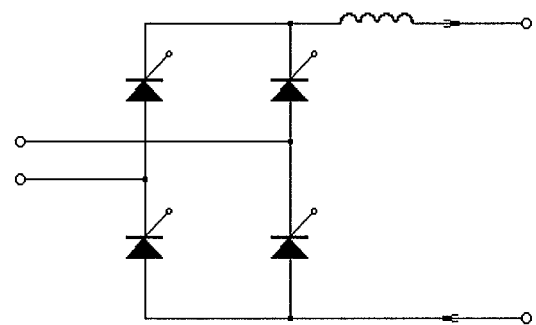
FIG. 12 illustrates the principle of the thyristor rectifier bridge, in which the output terminal is connected in series with the inductor, of the embodiment of the power feedback device according to the present invention.
Figure 13:
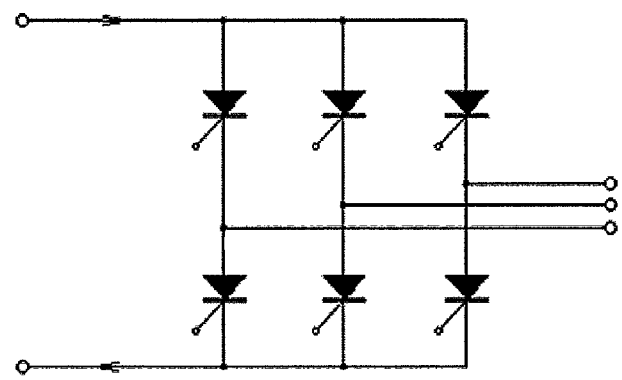
FIG. 13 illustrates the principle of the thyristor three-phase full-controlled bridge circuit of the embodiment of the power feedback device according to the present invention.

Wherein, the rectifier circuit is a diode rectifier bridge circuit. As shown in FIG. 10, FIG. 10 illustrates the principle of the diode rectifier bridge of the embodiment of the power feedback device according to the present invention. To further improve the controllability of the rectifier circuit, the rectifier circuit may also be a thyristor rectifier bridge circuit. As shown in FIG. 11, FIG. 11 illustrates the principle of the thyristor rectifier bridge of the embodiment of the power feedback device according to the present invention, and the thyristor rectifier circuit can be adopted to adjust voltage, thereby realizing the controllability of the circuit. Based on this, an inductor can be connected to the output terminal of the rectifier circuit to filter and current limit the DC output from the rectifier circuit. Taking the thyristor rectifier bridge circuit being the rectifier circuit as an example, as shown in FIG. 12, FIG. 12 illustrates the principle of the thyristor rectifier bridge, in which the output terminal is connected in series with the inductor, of the embodiment of the power feedback device according to the present invention. FIG. 13 illustrates the principle of the thyristor three-phase full-controlled bridge circuit of the embodiment of the power feedback device according to the present invention. As shown in FIG. 13, the thyristor three-phase full-controlled bridge circuit consists of six thyristors every two of which are connected in series to form three bridge arms which are then connected in parallel to form a three-phase full-controlled bridge circuit, thereby realizing converting the DC current filtered by the inductor into AC. Also, a plurality of thyristor three-phase full-controlled bridge circuits of different levels connected in series can be adopted to adapt to power generation device of different voltage levels and improve feedback power factors.

Figure 14:
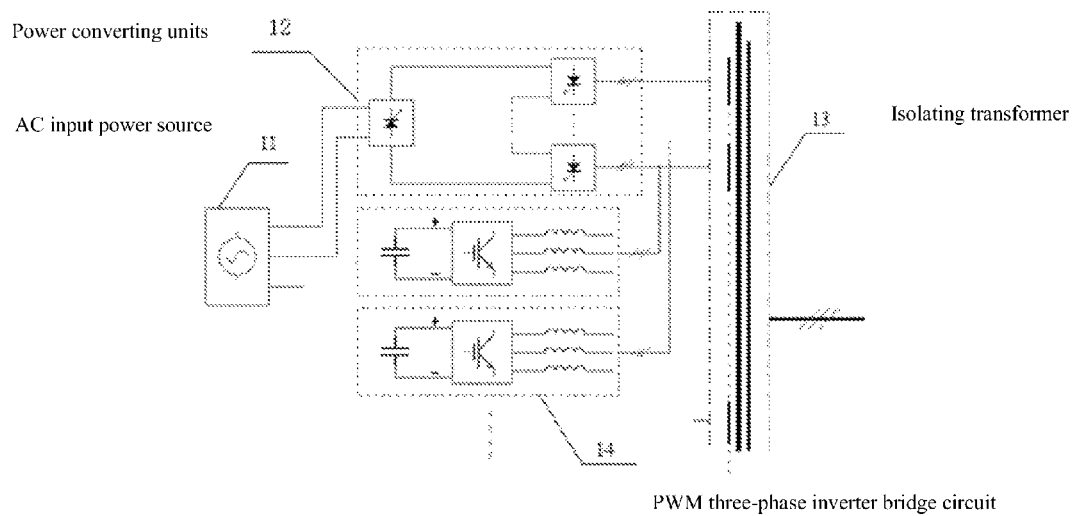
FIG. 14 illustrates the principle of the connection between the PWM three-phase inverter bridge circuit and the power converting unit of the embodiment of the power feedback device according to the present invention.
Figure 15:
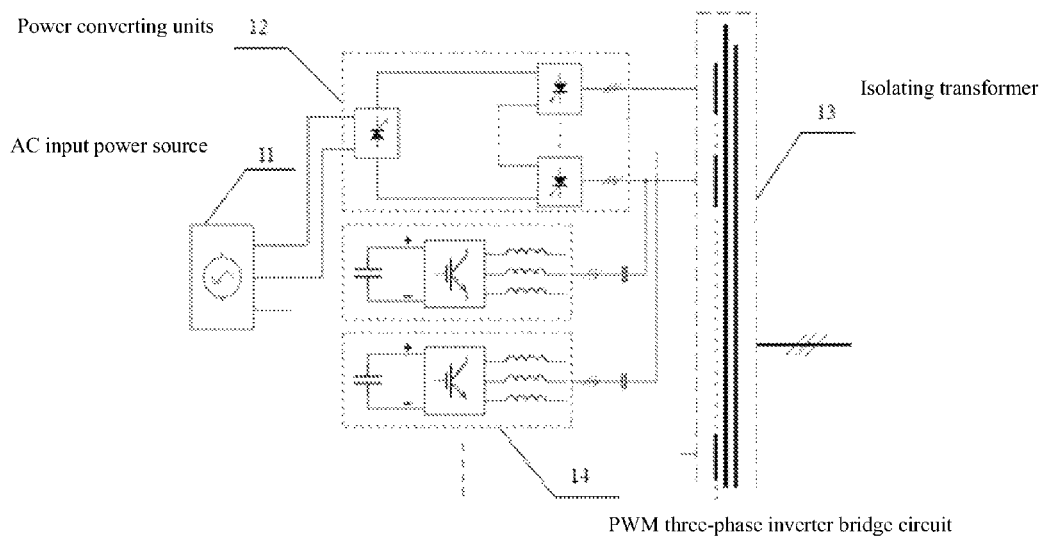
FIG. 15 illustrates the principle of the connection between the PWM three-phase inverter bridge circuit and the power converting unit via the isolating capacitor of the embodiment of the power feedback device according to the present invention.

The power feedback device may be further provided with at least one PWM three-phase inverter bridge circuit 14 to compensate the current power factors and harmonic at the primary side of the isolating transformer. The PWM three-phase inverter bridge circuit 14 may be formed by connecting a filtering capacitor with a fully controlled power semiconductor device, and the PWM three-phase inverter bridge circuit 14 is connected with the filtering capacitor at its DC side, and the three-phase lead-out terminal at its AC side is respectively connected with three output inductors for filtering and current limiting and then connected with one-path three-phase winding at the secondary side of the isolating transformer 13, or connected with the three-phase winding at the secondary side of the isolating transformer 13 via an isolating capacitor. Also, a plurality of PWM three-phase inverter bridge circuits 14, in which the output terminals are in series connection with an inductor, can be adopted to be respectively connected with the output terminals of the a plurality of power converting units 12. As shown in FIG. 14, FIG. 14 illustrates the principle of the connection between the PWM three-phase inverter bridge circuit and the power converting unit of the embodiment of the power feedback device according to the present invention, and the output terminal of the PWM three-phase inverter bridge circuit 14 can be respectively connected to the output terminals of the power converting units 12 via an isolating capacitor. Referring to FIG. 15, FIG. 15 illustrates the principle of the connection between the PWM three-phase inverter bridge circuit and the power converting units via the isolating capacitor of the embodiment of the power feedback device according to the present invention. The current power factor and harmonic at the primary side of the isolating transformer 13 can be compensated by adjusting the current at the alternating side of the PWM three-phase inverter bridge circuit 14.

Figure 16:
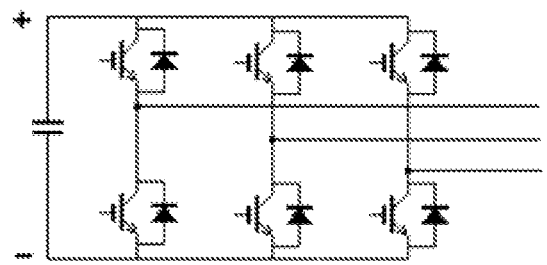
FIG. 16 illustrates the principle of the PWM three-phase inverter bridge circuit of IGBT adopted in the embodiment of the power feedback device according to the present invention.

The fully controlled power semiconductor device in the PWM three-phase inverter bridge circuit 14 may be an Insulated Gate Bipolar Transistor (hereinafter short for IGBT) or an Integrated Gate Commutated Thyristor (hereinafter short for IGCT), or other fully controlled power semiconductor devices. FIG. 16 illustrates the principle of the PWM three-phase inverter bridge circuit of IGBT adopted in the embodiment of the power feedback device according to the present invention. As shown in FIG. 16, for this circuit, six IGBTs are adopted, every two of which are connected in series to form three bridge arms which are then connected in parallel, and the positive and negative terminals at the DC current side of circuit are connected to the filtering capacitor in parallel, and the current at the AC side is controlled by controlling the turn-on or turn-off of the six IGBTs.

Figure 17:
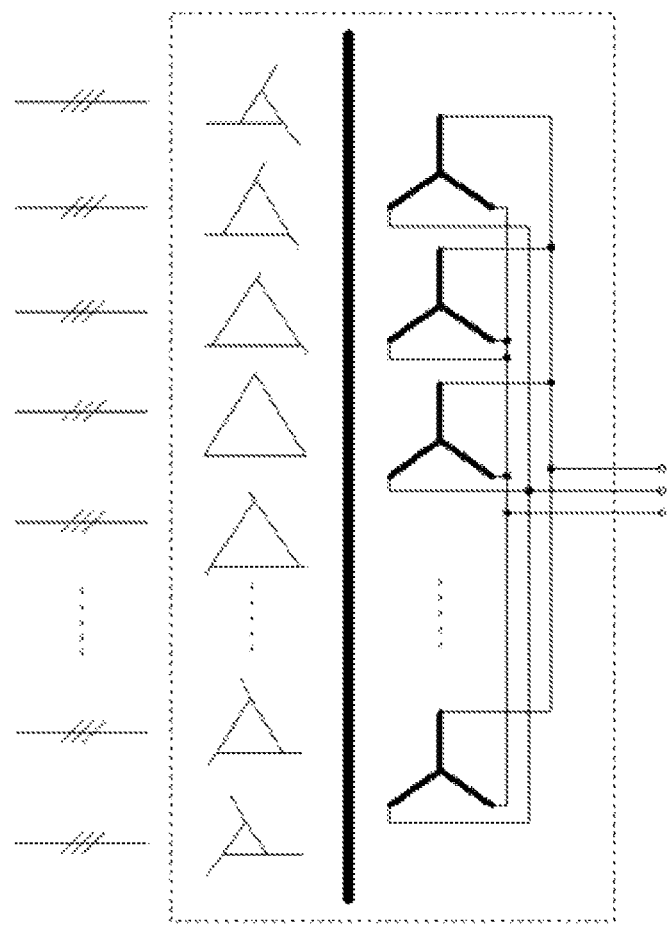
FIG. 17 illustrates the principle of the isolating transformer in split phase shift winding of the embodiment of the power feedback device according to the present invention.

The isolating transformer 13 in the power feedback device can be a split transformer in which the primary side windings are a plurality of three-phase windings connected in parallel, so that its secondary side winding short circuit impedance has a symmetric distribution. The isolating transformer 13 can also be a phase shift transformer in which the secondary side is in phase shift winding manner. As shown in FIG. 17, FIG. 17 illustrates the principle of the isolating transformer in split phase shift winding of the embodiment of the power feedback device according to the present invention, wherein the isolating transformer 13 includes multiple groups of primary side windings connected in parallel, and multiple paths of secondary side windings may be in delta-extended edge winding manner or zigzag phase shift winding manner, and different secondary side windings can be designed to be different phase shift angles. The split phase shift transformer can improve the waveform coefficients of the current fed back to the power network and reduce the harmonic.

The power feedback device according to the present invention improves the waveform coefficients of the current of the power generation device and increases the power factors and the utilization rate of the device by respectively power converting any two phases among the three phases or multiple phases of AC generated by the power generation device. Using thyristor as the main switch device of the power converting unit leads to low cost and high reliability, and different levels of series connected thyristor three-phase full-controlled bridge circuits can be applied to different levels of power generation device and improve feedback power factors. The multiple paths of windings at the secondary side of the isolating transformer match the device with power networks of different voltage levels, thereby improving the waveform coefficients and the power factors of the current fed back to the power networks and transmitting reactive power to the power network, and the current at the output terminal of the power generation device and the current at the power network side have high sine degree, and the device has advantages of high conversion efficiency, reliable operation, long service life, easy for popularization and maintenance.

The embodiments described above are only used to describe the technical solution of the present invention, which are not used to restrict the present invention. Although the present invention has been detailed above with reference to the above embodiments thereof, for those skilled in the art, it should be appreciated that the technical solutions of the embodiments of the present invention may have various changes and variations and equivalent replacements. Any amendments, equivalent substitutions, improvements etc. within the spirit and principle of the present invention are all included in the scope of protection of the present invention.

What is claimed is:

1. A power feedback device, including: an AC input power source, the AC input power source being a three-phase or a multi-phase AC for generating power, or the AC input power source being a three-phase or a multi-phase AC, each output terminal of the AC input power source being connected in series with an inductor, for generating power; a plurality of power converting units, input terminals, of the plurality of power converting units being respectively connected with only two phases of the AC input power source, for power converting the two phases of AC generated by the AC input power source respectively; an isolating transformer, a primary side, of the isolating transformer, being a three-phase winding and connected with a power network, a secondary side of the isolating transformer, being multi-path three-phase windings and connected with output terminals of the plurality of power converting units, for feeding the AC converted by the plurality of power converting units back to the power network.

2. The power feedback device according to claim 1, where at least one of the plurality of power converting units includes:
   a rectifier circuit, for converting a single-phase AC of the AC input power source into DC;
   a thyristor three-phase full-controlled bridge circuit or a thyristor three-phase full-controlled bridge circuit string with its plurality of input terminals connected in series, the input terminals of which are connected with output terminals of the rectifier circuit, for converting the DC output from the rectifier circuit into AC.

3. The power feedback device according to claim 2, where the at least one of the plurality of power converting units further includes:
   an inductor, provided between the rectifier circuit and the thyristor three-phase full-controlled bridge circuit or the thyristor three-phase full-controlled bridge circuit string with its plurality of input terminals connected in series, for filtering and current limiting the DC output from the rectifier circuit.

4. The power feedback device according to claim 2, where the rectifier circuit is a diode rectifier bridge circuit or a thyristor rectifier bridge circuit.

5. The power feedback device according to claim 3, where the rectifier circuit is a diode rectifier bridge circuit or a thyristor rectifier bridge circuit.

6. The power feedback device according to claim 1, further including:
   at least one Pulse Width Modulation (PWM) three-phase inverter bridge circuit consisting of a filtering capacitor and a fully controlled power semiconductor device,
   output terminals of the PWM three-phase inverter bridge circuit being connected in series with inductors and then connected to the three-phase windings of the secondary side of the isolating transformer, or being connected with the output terminals of the plurality of power converting units, or being connected with the output terminals of the plurality of power converting units via an isolating capacitor, or being connected with the three-phase windings of the secondary side of the isolating transformer via an isolating capacitor, for compensating a current power factor and harmonic at the primary side of the isolating transformer.

7. The power feedback device according to claim 6, where the fully controlled power semiconductor device is an Insulated Gate Bipolar Transistor (IGBT) or an Integrated Gate Commutated Thyristor (IGCT).

8. The power feedback device according to claim 1 where the isolating transformer is a split transformer with its primary-side windings being a plurality of three-phase windings connected in parallel, or a phase shift transformer with its secondary-side windings being formed in phase shift winding.

9. The power feedback device according to claim 6, where the isolating transformer is a split transformer with its primary-side windings being a plurality of three-phase windings connected in parallel, or a phase shift transformer with its secondary-side windings being formed in phase shift winding.

10. The power feedback device according to claim 2, further including:
at least one Pulse Width Modulation (PWM) three-phase inverter bridge circuit including a filtering capacitor and a fully controlled power semiconductor device, output terminals of the PWM three-phase inverter bridge circuit being connected in series with inductors and then connected to the three-phase windings of the secondary side of the isolating transformer, or being connected with the output terminals of the power converting units, or being connected with the output terminals of the power converting units via an isolating capacitor, or being connected with the three-phase windings of the secondary side of the isolating transformer via an isolating capacitor, for compensating the current power factor and harmonic at the primary side of the isolating transformer.

11. The power feedback device according to claim 3, further including:
at least one Pulse Width Modulation (PWM) three-phase inverter bridge circuit including a filtering capacitor and a fully controlled power semiconductor device, output terminals of the PWM three-phase inverter bridge circuit being connected in series with inductors and then connected to the three-phase windings of the secondary side of the isolating transformer, or being connected with the output terminals of the plurality of power converting units, or being connected with the output terminals of the plurality of power converting units via an isolating capacitor, or being connected with the three-phase windings of the secondary side of the isolating transformer via an isolating capacitor, for compensating a current power factor and harmonic at the primary side of the isolating transformer.

12. The power feedback device according to claim 4, further including:
at least one Pulse Width Modulation (PWM) three-phase inverter bridge circuit including a filtering capacitor and a fully controlled power semiconductor device, output terminals of the PWM three-phase inverter bridge circuit being connected in series with inductors and then connected to the three-phase windings of the secondary side of the isolating transformer, or being connected with the output terminals of the plurality of power converting units, or being connected with the output terminals of the plurality of power converting units via an isolating capacitor, or being connected with the three-phase windings of the secondary side of the isolating transformer via an isolating capacitor, for compensating a current power factor and harmonic at the primary side of the isolating transformer.

13. The power feedback device according to claim 5, further including:
at least one Pulse Width Modulation (PWM) three-phase inverter bridge circuit including a filtering capacitor and a fully controlled power semiconductor device, output terminals of the PWM three-phase inverter bridge circuit being connected in series with inductors and then connected to the three-phase windings of the secondary side of the isolating transformer, or being connected with the output terminals of the plurality of power converting units, or being connected with the output terminals of the plurality of power converting units via an isolating capacitor, or being connected with the three-phase windings of the secondary side of the isolating transformer via an isolating capacitor, for compensating a current power factor and harmonic at the primary side of the isolating transformer.

14. The power feedback device according to claim 2 where the isolating transformer is a split transformer with its primary-side windings being a plurality of three-phase windings connected in parallel, or a phase shift transformer with its secondary-side windings being formed in phase shift winding.

15. The power feedback device according to claim 3 where the isolating transformer is a split transformer with its primary-side windings being a plurality of three-phase windings connected in parallel, or a phase shift transformer with its secondary-side windings being formed in phase shift winding.

16. The power feedback device according to claim 4 where the isolating transformer is a split transformer with its primary-side windings being a plurality of three-phase windings connected in parallel, or a phase shift transformer with its secondary-side windings being formed in phase shift winding.

17. The power feedback device according to claim 5 where the isolating transformer is a split transformer with its primary-side windings being a plurality of three-phase windings connected in parallel, or a phase shift transformer with its secondary-side windings being formed in phase shift winding.

18. The power feedback device according to claim 7 where the isolating transformer is a split transformer with its primary-side windings being a plurality of three-phase windings connected in parallel, or a phase shift transformer with its secondary-side windings being formed in phase shift winding.

* * * * *